United States Patent [19]

Shimizu et al.

[11] Patent Number: 5,559,555
[45] Date of Patent: Sep. 24, 1996

[54] APPARATUS FOR PERFORMING EXPOSURE CONTROL PERTAINING TO THE LUMINANCE LEVEL OF AN OBJECT

[75] Inventors: Shuji Shimizu, Kanagawa; Osamu Kuroda, Tokyo; Yasutaka Ito; Yoshikazu Takahashi, both of Kanagawa, all of Japan

[73] Assignee: Sony Corporation, Tokyo, Japan

[21] Appl. No.: 442,495

[22] Filed: May 16, 1995

Related U.S. Application Data

[62] Division of Ser. No. 260,381, Jun. 14, 1994, Pat. No. 5,473,374.

[30] Foreign Application Priority Data

Jun. 17, 1993 [JP] Japan ................... 5-171135
Jul. 12, 1993 [JP] Japan ................... 5-195218

[51] Int. Cl.⁶ ................................. H04N 5/238
[52] U.S. Cl. ................. 348/364; 348/229; 348/363
[58] Field of Search ........................ 348/207, 362, 348/363, 364, 229, 234, 235; 354/410, 412; H04N 5/238

[56] References Cited

U.S. PATENT DOCUMENTS 5,258,848  11/1993  Kondo et al. ................. 348/363
5,386,231  1/1995  Shimizu et al. ............... 348/296

Primary Examiner—Wendy Garber
Assistant Examiner—Tuan V. Ho
Attorney, Agent, or Firm—William S. Frommer; Alvin Sinderbrand

[57] ABSTRACT

An exposing apparatus comprises: a lens group to fetch a light from an object; an iris to adjust a light amount from the lens group; an image pickup device to convert the light which passed through the iris into the electric signal; a detecting circuit to detect a luminance signal level from an output signal from the image pickup device; a reference level signal setting circuit to set an exposure control reference value to control the iris; an exposure control reference value modulating circuit to modulate the exposure control reference value when the iris is controlled; and a control circuit to set the exposure control reference value in correspondence to the luminance signal level when an output level of the detecting circuit is larger than a set value.

5 Claims, 14 Drawing Sheets

Fig. 13

NTSC

| 1/61 | −0.14 | 1/71 | −1.46 | 1/81 | −2.61 | 1/91 | −3.62 |
|---|---|---|---|---|---|---|---|
| 1/62 | −0.28 | 1/72 | −1.58 | 1/82 | −2.71 | 1/92 | −3.71 |
| 1/63 | −0.42 | 1/73 | −1.70 | 1/83 | −2.82 | 1/93 | −3.81 |
| 1/64 | −0.56 | 1/74 | −1.82 | 1/84 | −2.92 | 1/94 | −3.90 |
| 1/65 | −0.70 | 1/75 | −1.94 | 1/85 | −3.03 | 1/95 | −3.99 |
| 1/66 | −0.83 | 1/76 | −2.05 | 1/86 | −3.13 | 1/96 | −4.08 |
| 1/67 | −0.96 | 1/77 | −2.17 | 1/87 | −3.23 | 1/97 | −4.17 |
| 1/68 | −1.09 | 1/78 | −2.28 | 1/88 | −3.33 | 1/98 | −4.26 |
| 1/69 | −1.21 | 1/79 | −2.39 | 1/89 | −3.43 | 1/99 | −4.35 |
| 1/70 | −1.34 | 1/80 | −2.50 | 1/90 | −3.52 | 1/100 | −4.44 |

Fig. 14A PAL

| | | | | | | |
|---|---|---|---|---|---|---|
| 1/51 | -0.17 | 1/61 | -1.73 | 1/71 | -3.05 | 1/81 | -4.19 |
| 1/52 | -0.34 | 1/62 | -1.87 | 1/72 | -3.17 | 1/82 | -4.30 |
| 1/53 | -0.51 | 1/63 | -2.01 | 1/73 | -3.29 | 1/83 | -4.40 |
| 1/54 | -0.69 | 1/64 | -2.14 | 1/74 | -3.41 | 1/84 | -4.51 |
| 1/55 | -0.83 | 1/65 | -2.28 | 1/75 | -3.52 | 1/85 | -4.61 |
| 1/56 | -0.98 | 1/66 | -2.41 | 1/76 | -3.64 | 1/86 | -4.71 |
| 1/57 | -1.14 | 1/67 | -2.54 | 1/77 | -3.75 | 1/87 | -4.81 |
| 1/58 | -1.29 | 1/68 | -2.67 | 1/78 | -3.86 | 1/88 | -4.91 |
| 1/59 | -1.44 | 1/69 | -2.80 | 1/79 | -3.97 | 1/89 | -5.01 |
| 1/60 | -1.58 | 1/70 | -2.92 | 1/80 | -4.08 | 1/90 | -5.11 |

Fig. 14B

| | | | | | | |
|---|---|---|---|---|---|---|
| 1/91 | -5.20 | 1/101 | -6.11 | 1/111 | -6.93 |
| 1/92 | -5.30 | 1/102 | -6.19 | 1/112 | -7.00 |
| 1/93 | -5.39 | 1/103 | -6.28 | 1/113 | -7.08 |
| 1/94 | -5.48 | 1/104 | -6.36 | 1/114 | -7.16 |
| 1/95 | -5.58 | 1/105 | -6.44 | 1/115 | -7.23 |
| 1/96 | -5.67 | 1/106 | -6.53 | 1/116 | -7.31 |
| 1/97 | -5.76 | 1/107 | -6.61 | 1/117 | -7.38 |
| 1/98 | -5.85 | 1/108 | -6.69 | 1/118 | -7.46 |
| 1/99 | -5.93 | 1/109 | -6.77 | 1/119 | -7.53 |
| 1/100 | -6.02 | 1/110 | -6.85 | 1/120 | -7.60 |

APPARATUS FOR PERFORMING EXPOSURE CONTROL PERTAINING TO THE LUMINANCE LEVEL OF AN OBJECT

This application is a division of application Ser. No. 08/260,381, filed Jun. 14, 1994 U.S. Pat. No. 5,473,374.

BACKGROUND OF THE INVENTION

1. Field of the Invention

The invention relates to exposing apparatus and method which are suitable for use in, for example, a video camera.

2. Description of the Prior Art

As shown in U.S. Pat. No. 5,093,716 by the applicant of the present invention, a video camera has an exposing apparatus comprising an iris, an electronic shutter, an AGC amplifier, and the like in order to make an input to a signal processing circuit constant. In FIG. 1, a circuit block diagram of a video camera in which the exposing apparatus is installed is shown. In FIG. 1, an object image is supplied to a CCD image pickup device 103 through a lens section 101 and an iris 102. In the CCD image pickup device 103, a light amount of the incident object image is photoelectrically converted. An output signal of the CCD image pickup device 103 is supplied to an AGC amplifier 104. An output signal of the AGC amplifier 104 is converted into a digital signal by an A/D converter 105 and supplied to a signal processing circuit 106 and a detecting circuit 107. The signal supplied to the signal processing circuit 106 is subjected to a predetermined signal process such as gamma correction or the like and, after that, the processed signal is output.

The digital signal supplied to the detecting circuit 107 is detected and, after that, it is supplied to a comparator 108. A signal at a reference level is supplied to the comparator 108 from a reference level signal generating section 109. Thus, the signal supplied from the detecting circuit 107 is compared with the reference signal. A detection output of the comparator 108 is supplied to a control amount operating circuit 111 through a loop filter 110. The control amount operating circuit 111 calculates an opening degree of the iris 102, a shutter speed of the CCD image pickup device 103, and a gain of the AGC amplifier 104 on the basis of the supplied signal. The calculation values calculated by the control amount operating circuit 111 are supplied to an iris driving circuit 112 to control the opening/closing operation of the iris 102, a shutter driving circuit 113 to control the shutter speed of the CCD image pickup device 103, and a D/A converter 114 to control the gain of the AGC amplifier 104.

There has been put into practical use a video camera with a hand vibration correcting function for detecting and correcting a hand vibration in the case where the hand vibration occurred, namely, a video camera having a hand vibration correcting function of the image processing type by a system in which a portion to be taken out as an image in an output signal of a CCD image pickup device as a photoelectric converting device is changed at any time in accordance with a hand vibration amount. For example, a device of the PAL system is used as a CCD image pickup device mentioned above. Due to this, after the hand vibration correction was performed to the photographed signal, an image signal of the NTSC system is output.

In such a video camera, in order to make the most of the effect of the hand vibration correction, it is necessary to improve a moving object resolution of an object whose image is formed on the CCD image pickup device. For this purpose, the electronic shutter speed of the CCD image pickup device is set to a speed higher than a standard speed (1/60 second in the NTSC system; 1/50 second in the PAL system), thereby improving the moving object resolution of the object. Generally, in consideration of the prevention of a flicker phenomenon which occurs in case of photographing under the irradiation of a fluorescent lamp, the electronic shutter speed is set to 1/100 second in the NTSC system and to 1/120 second in the PAL system.

On the other hand, the exposing apparatus controls the numerical aperture of the iris, electronic shutter speed, and gain of the AGC amplifier so that the image pickup signal level coincides with the exposure control reference value within a control range (a range from a control value in which each gain becomes maximum to a control value in which it becomes minimum is set to a control range). Therefore, in such an exposing apparatus, for example, in case of photographing the same object, even if the brightness (luminance level) of the object differs, a constant exposure amount is output so long as it lies within the exposure control range. However, when the brightness of the object changes, the brightness at which the user actually sees and feels obviously changes. Therefore, a difference occurs between the brightness of the video signal output of the video camera and the brightness which each user feels and the brightness of an object video image which is output to the monitor or the like differs from the actual brightness. Consequently, the brightness of the object video image of the final output becomes unnatural.

In the video camera as mentioned above, in the operating state of the hand vibration correcting function, the electronic shutter speed is set to 1/100 second or 1/120 second irrespective of the brightness of the object. Therefore, an exposure amount is always lost by only about −4.5 dB in the NTSC system and by only about −7.6 dB in the PAL system. Consequently, the minimum object illuminance of the video camera increases due to such a lost exposure amount and the performance is deteriorated with respect to a point of the operation guarantee illuminance range.

OBJECTS AND SUMMARY OF THE INVENTION

It is, therefore, an object of the invention to provide exposing apparatus and method which can perform the optimum exposure control in correspondence to a luminance level of an object.

Another object of the invention is to provide exposing apparatus and method which can prevent that the minimum object illuminance range is narrowed and can perform a natural exposure control even in case of executing a hand vibration correction.

According to the invention, the above objects are accomplished by an exposing apparatus comprising: a lens group for fetching a light from an object; an iris for adjusting a light amount from the lens group; an image pickup device for converting the light which passed through the iris into the electric signal; an AGC circuit for setting a signal level of an output signal from the image pickup device into a predetermined level; a detecting circuit for detecting a luminance signal level from an output signal from the AGC circuit; a reference signal level generating circuit for generating a reference signal to control the iris; an exposure control reference value modulating circuit for modulating a control reference value when the iris is controlled; and a control circuit for setting the exposure control reference value in correspondence to the luminance level when an output level of the detecting circuit is larger than a set value.

According to the invention, there is provided a video camera having an exposing apparatus, wherein the video camera comprises: a lens group for fetching a light from an object; an iris for adjusting an amount of light from the lens group; an image pickup device for converting the light which passed through the iris into the electric signal; an AGC circuit for setting a signal level of an output signal from the image pickup device into a predetermined level; a detecting circuit for detecting a luminance signal level from an output signal from the AGC circuit; a reference signal level generating circuit for generating a reference signal to control the iris; an exposure control reference value modulating circuit for modulating a control reference value when the iris is controlled; and a control circuit for setting the exposure control reference value in correspondence to a luminance level when an output level of the detecting circuit is larger than a set value.

According to the invention, there is provided an exposing apparatus of a video camera with a hand vibration correcting function of the image processing type such that a photographed picture plane is moved in accordance with a hand vibration amount, wherein the exposing apparatus comprises: iris control means for setting a gain of an iris; AGC amplifier control means for setting a gain of an AGC amplifier; shutter control means for setting a gain of an electronic shutter; and control means for controlling a gain of the video camera by the iris control means in a first range indicative of an object illuminance when the hand vibration correcting function is made operative, for controlling the gain of the video camera by the AGC amplifier control means in a second range indicative of the object illuminance, and for controlling the gain of the video camera by the shutter control means in a third range indicative of the object illuminance.

According to the invention, there is also provided an exposure control method of a video camera with a hand vibration correcting function of the image processing type such that a photographed picture plane is moved in accordance with a hand vibration amount, wherein when the hand vibration correcting function is made operative, a gain of the video camera is controlled by a gain of an iris in a first range indicative of an object illuminance, the gain of the video camera is controlled by the gain of an AGC amplifier in a second range indicative of the object illuminance, and the gain of the video camera is controlled by the gain of a shutter in a third range indicative of the object illuminance.

The above and other objects and features of the present invention will become apparent from the following detailed description and the appended claims with reference to the accompanying drawings.

BRIEF DESCRIPTION OF THE DRAWINGS

FIG. 13 is a diagram showing the relation between a shutter speed in the NTSC system and a gain corresponding thereto; and FIGS. 14A and 14B are diagrams showing the relation between a shutter speed in the PAL system and a gain corresponding thereto.

DETAILED DESCRIPTION OF THE PREFERRED EMBODIMENTS

Figure 1:
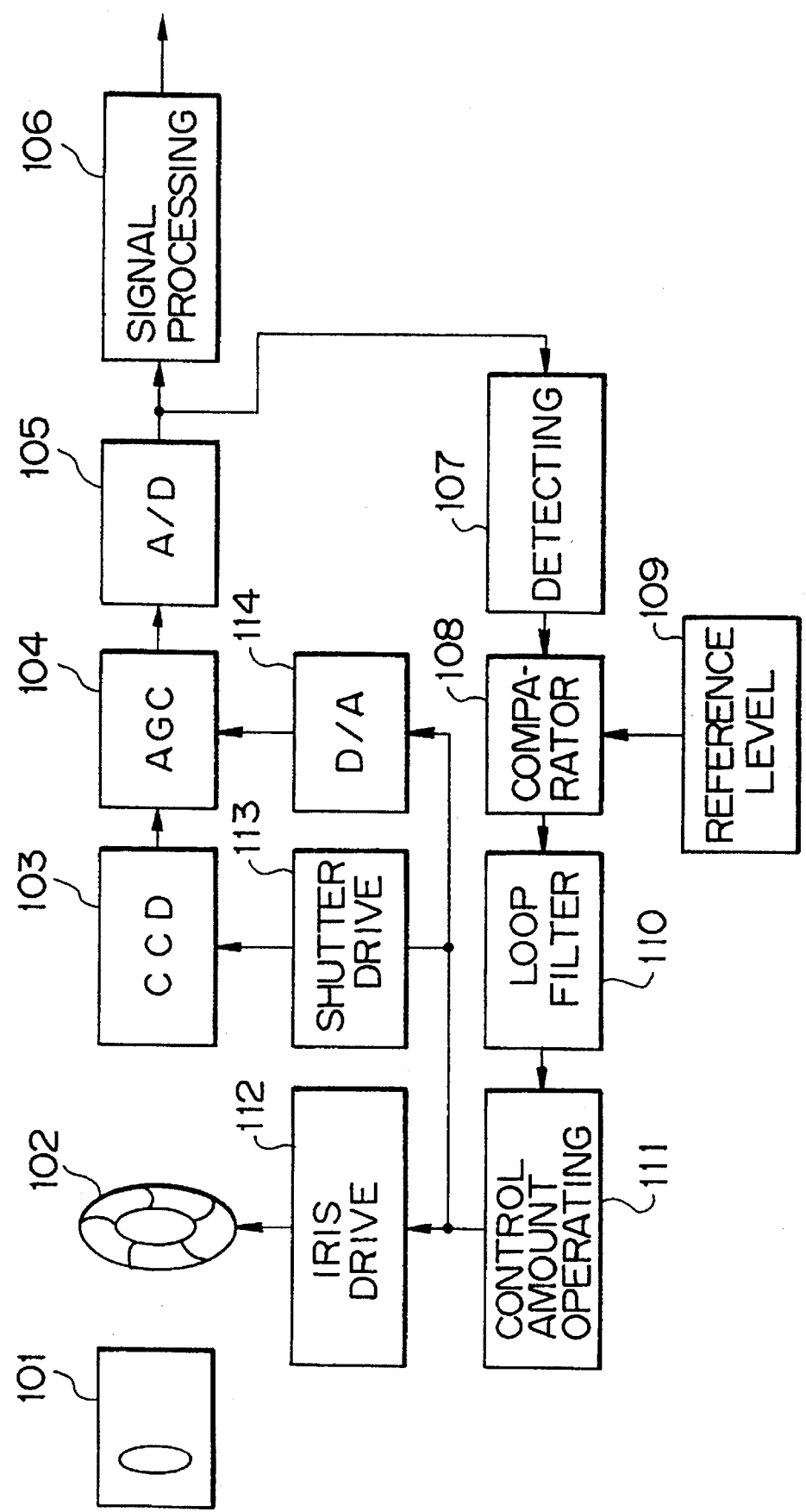
FIG. 1 is a circuit block diagram of a conventional video camera having an exposure control apparatus.
Figure 2:
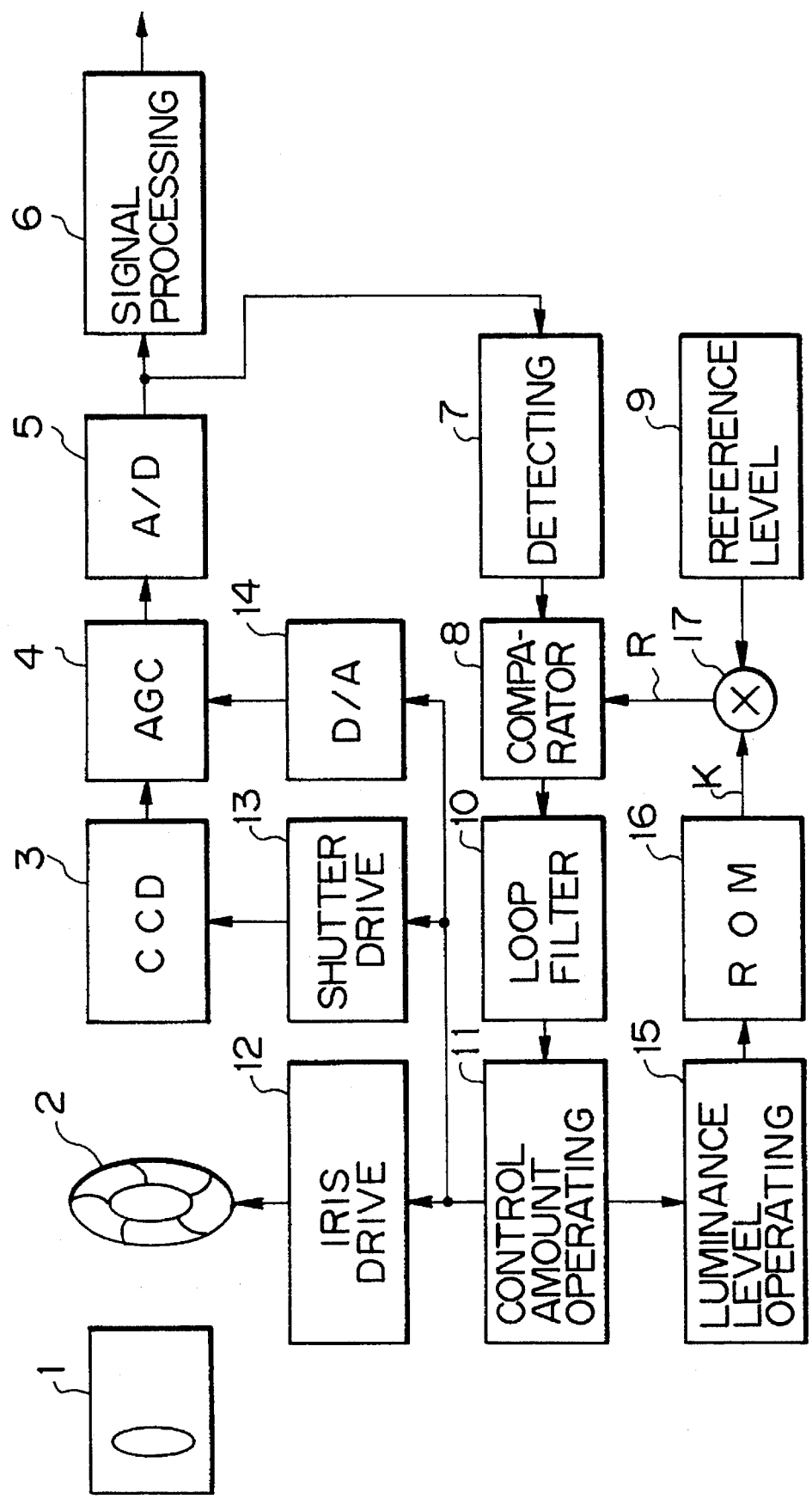
FIG. 2 is a block diagram of a video camera to which an exposing apparatus according to the invention is applied.

An exposing apparatus according to the invention will be described hereinbelow with reference to the drawings. FIG. 2 shows a block diagram of a video camera to which the exposing apparatus according to the invention is applied. In FIG. 2, a light amount of an object image which entered through a lens 1 passes through an iris 2 and is formed as an image on a photosensitive surface of a CCD image pickup device 3 and is photoelectrically converted. An output of the CCD image pickup device 3 is supplied to an AGC amplifier 4. An output of the AGC amplifier 4 is supplied to an A/D converter 5. The A/D converter 5 converts the analog image pickup signal to the digital image pickup signal. The digital image pickup signal is supplied to a signal processing circuit 6 and to a detecting circuit 7. The digital signal supplied to the signal processing circuit 6 is subjected to a predetermined signal process and, after that, the processed signal is output.

On the other hand, the digital signal supplied to the detecting circuit 7 is detected and is supplied to a comparator 8 after that. A reference level modulation signal R is supplied to the comparator 8 from a multiplying circuit 17, which will be explained hereinlater. An output of the comparator 8 is supplied to a control amount operating circuit 11 through a loop filter 10. The control amount operating circuit 11 obtains a numerical aperture of the iris 2 according to the image pickup signal level, an electronic shutter speed of the CCD image pickup device 3, and a gain amount of the AGC amplifier 4. The values calculated by the control amount operating circuit 11 are supplied to an iris driving circuit 12, an electronic shutter driving circuit 13, a D/A converter 14, and a luminance level operating circuit 15. The opening/closing operation of the iris 2 is controlled by the iris driving circuit 12. The electronic shutter speed of the CCD image pickup device 3 is set by the shutter driving circuit 13. Further, the gain Of the AGC amplifier 4 is set in accordance with an output of the D/A converter 14.

The gain of the iris 2, the electronic shutter speed of the CCD image pickup device 3, and the gain amount of the AGC amplifier 4 which were obtained by the control amount operating circuit 11 are supplied to the luminance level operating circuit 15. On the basis of those values, the luminance level of the image pickup signal is calculated. An output of the luminance level operating circuit 15 is supplied to an ROM 16. A reference level modulation coefficient K (which will be explained hereinlater) according to the brightness of the object, namely, the luminance level has been stored in the ROM 16. The reference level modulation coefficient K according to the output of the luminance level operating circuit 15 is supplied from the ROM 16 to the multiplying circuit 17. A predetermined exposure reference signal is supplied from an exposure reference level signal setting circuit 9 to the multiplying circuit 17. The reference signal is modulated by the multiplying circuit 17 in accordance with the reference level modulation coefficient K. The reference level modulation signal R as a result of the modulation is supplied to the comparator 8. By increasing the level of the exposure reference signal which is supplied from the reference level signal setting circuit 9, the iris 2 is controlled so as to be opened in a high luminance state. Due to this, a diffraction phenomenon of the iris in a small iris state can be avoided.

The reference level modulation coefficient K stored in the ROM 16 will now be described hereinbelow with reference to FIG. 3. In the case where, for example, a standard white paper of a reflectance of 80% was photographed so as to lie within a whole screen, when the luminance level of the object is small, for instance, the reference level modulation coefficient K is equal to 1.0 until the luminance level of 1,000 cd/m$^2$ (luminance level in the case where the object was photographed under the illuminance of 4,000 lux), and an exposure control is executed in a manner similar to the conventional manner. On the other hand, when the luminance level of the object is increased to a value over 1,000 cd/m$^2$, the modulation coefficient K gradually increases. When the luminance level of the object reaches 25,000 cd/m$^2$ (luminance level in the case where the object was photographed under illuminance of 100,000 lux), the modulation coefficient K=1.5. The reference level signal is set to a value that is two times as large as the predetermined reference level.

Figure 3:
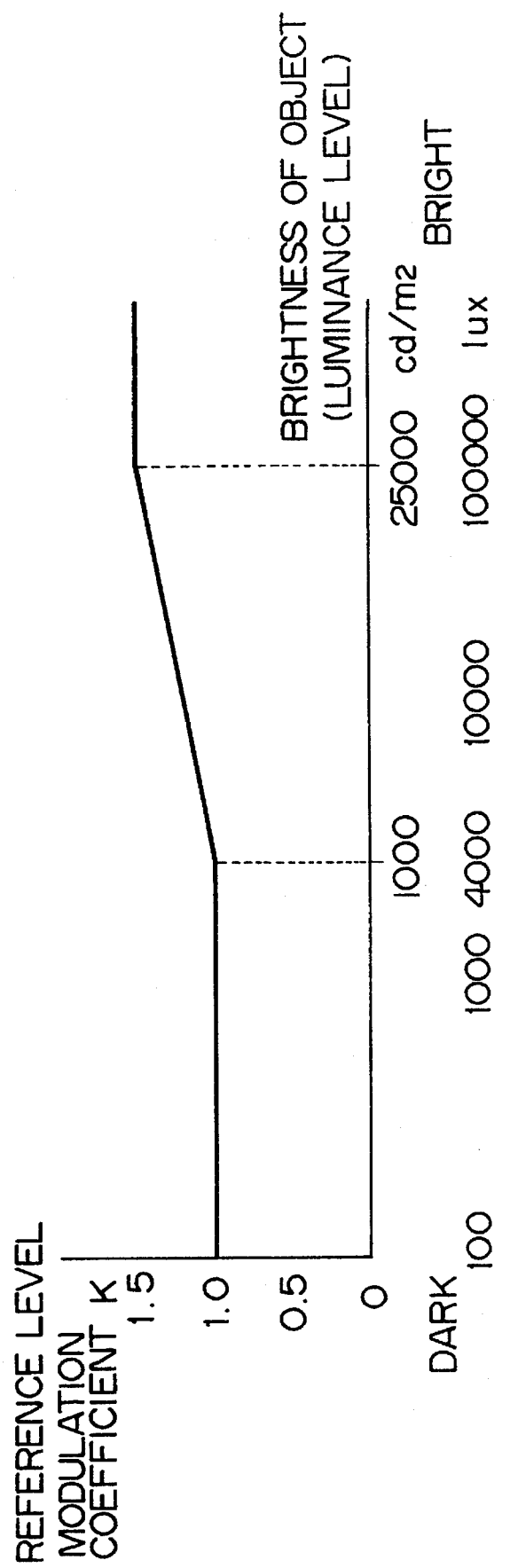
FIG. 3 is a diagram regarding a reference level modulation coefficient K stored in an ROM.
Figure 4:
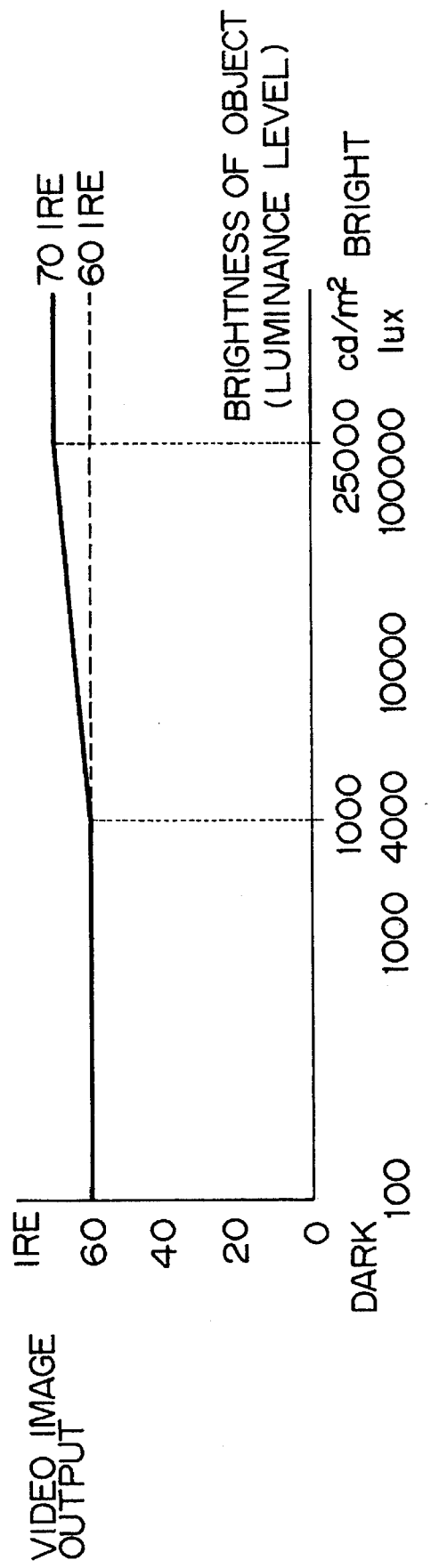
FIG. 4 is a diagram showing a change in reference level modulation coefficient K due to a luminance level by a change in video image output signal level.

FIG. 4 shows a change in reference level modulation coefficient K due to the luminance level by a change in video image output signal level. FIG. 4 relates to the case where a standard white paper of a reflectance of 80% is selected as an object in a manner similar to that mentioned above and the object is photographed so that its image lies within the whole picture plane. A solid line in FIG. 3 shows a transition of the reference level modulation coefficient K according to the invention. A broken line indicates a transition of the reference level modulation coefficient K by the conventional exposure control apparatus.

In the conventional exposing apparatus of the video camera, the video output signal level in the case where the standard white paper of the reflectance of 80% was photographed so that the image lies within the whole picture plane always indicates an output level of about 60 IRE as shown by a broken line. Such an output level is set to an almost constant value so long as it lies within an exposure control range. The reason why the video output signal level is not increased by 1.5 times even when the reference level is increased by 1.5 times is because a gamma correcting circuit is included in the signal processing circuit 6. In the case where the actual image pickup object such as a sky or the like was photographed as an object instead of the standard white paper, the video output signal level is also constant irrespective of the brightness of the sky in a manner similar to the above. Such a state is obviously unnatural for a change in brightness which the user actually sees and feels. This is because a concept of the brightness doesn't exist in the exposing apparatus.

On the other hand, according to the invention, since the reference level of the exposure control is largely modulated in accordance with the luminance level, namely, the brightness of the object image, the output video signal level is set to about 70 IRE when the reference level modulation coefficient K=1.5. That is, since the video signal level which is output increases in accordance with the brightness, a natural exposure control such that the user sees the object and feels that it is bright or dark can be executed.

The curve of the reference level modulation coefficient K is merely shown as an example in FIG. 3. By setting such a curve to a desired curve, a free exposure control can be performed. The luminance level is calculated in the luminance level operating circuit 15 by the following arithmetic equation.

Output of the detecting circuit=[luminance level]×[gain (opening/closing amount) of the iris]×[gain (speed) of the electronic shutter]×[gain of the AGC amplifier]×[photoelectric conversion efficiency of the CCD image pickup device]

Figure 5:
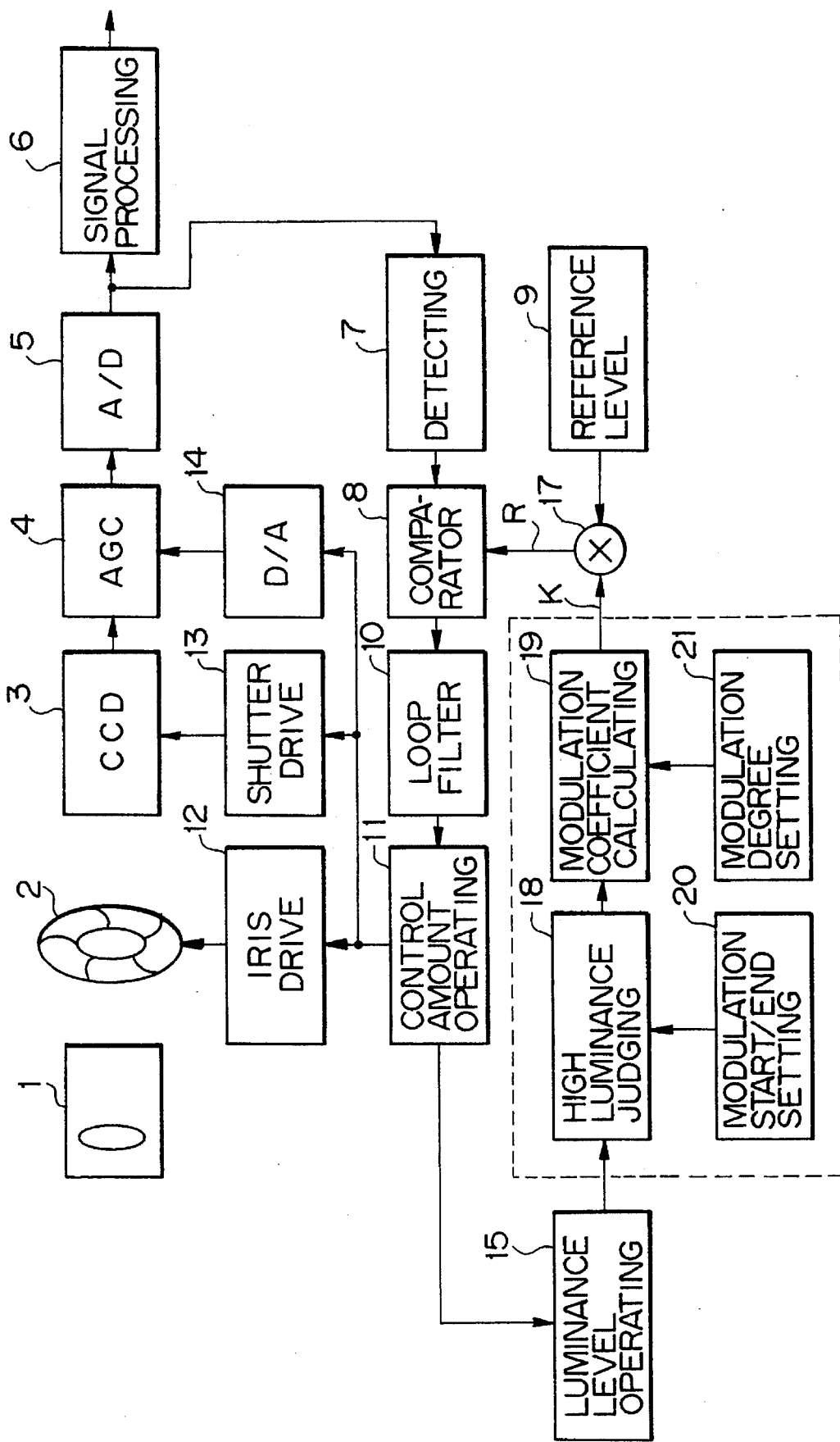
FIG. 5 is a block diagram of a modification of a video camera to which an exposure control apparatus according to the invention is applied.

FIG. 5 is a block diagram of a modification of a video camera to which the exposing apparatus according to the invention is applied. In FIG. 5, the same circuits as those shown in FIG. 2 are designated by the same reference numerals. In FIG. 5, a light amount of the object image which entered through the lens 1 passes through the iris 2 and its image is formed on the photosensitive surface of the CCD image pickup device 3 and is photoelectrically converted. The output of the CCD image pickup device 3 is supplied to the AGC amplifier 4. The output of the AGC amplifier 4 is supplied to the A/D converter 5. The A/D converter 5 converts the analog image pickup signal into the digital image pickup signal. The digital image pickup signal is supplied to the signal processing circuit 6 and to the detecting circuit 7. The signal processing circuit 6 executes a predetermined signal process to the supplied digital signal and, after that, outputs the processed signal.

On the other hand, the digital signal supplied to the detecting circuit 7 is detected and is supplied to the comparator 8 after that. The reference level modulation signal R is set into the comparator 8 from the multiplying circuit 17, which will be explained hereinlater. The output of the comparator 8 is supplied to the control amount operating circuit 11 through the loop filter 10. The gain (numerical aperture) of the iris 2 according to the image pickup signal level, the gain (electronic shutter speed) of the CCD image pickup device 3, and the gain amount of the AGC amplifier 4 are obtained in the control amount operating circuit 11. The values calculated by the control amount operating circuit 11 are supplied to the iris driving circuit 12, electronic shutter driving circuit 13, D/A converter 14, and luminance level operating circuit 15. The opening/closing operation of the iris 2 is controlled by the iris driving circuit 12. The electronic shutter speed of the CCD image pickup device 3 is set by the shutter driving circuit 13. The gain of the AGC amplifier 4 is set in accordance with the output of the D/A converter 14.

The gain amount of the iris 2, the electronic shutter speed of the CCD image pickup device 3, and the gain amount of the AGC amplifier 4 which were obtained in the control amount operating circuit 11 are supplied to the luminance level operating circuit 15. On the basis of those values, the luminance level of the image pickup signal is calculated. The output of the luminance level operating circuit 15 is supplied to a high luminance judging circuit 18. A modulation start/end setting circuit 20 is connected to the high luminance judging circuit 18. A start luminance level and an end luminance level of the reference level modulation are set by the modulation start/end setting circuit 20. On the basis of the set values of the start and end luminance levels, a modulation coefficient calculation level is supplied to a modulation coefficient calculating circuit 19. A modulation degree setting circuit 21 is connected to the modulation coefficient calculating circuit 19. A maximum modulation degree has been set into the modulation coefficient calculating circuit 19 by the modulation degree setting circuit 21. The reference level modulation coefficient K according to the modulation coefficient calculation level and the maximum modulation degree is calculated and supplied to the multiplying circuit 17. A predetermined exposure reference signal is supplied to the multiplying circuit 17 from the exposure reference level signal setting circuit 9. A modulation arithmetic operation of the reference signal according to the reference level modulation coefficient K is executed by the multiplying circuit 17. The reference level modulation signal R as a result of such a modulation operation is supplied to the comparator 8.

Figure 6:
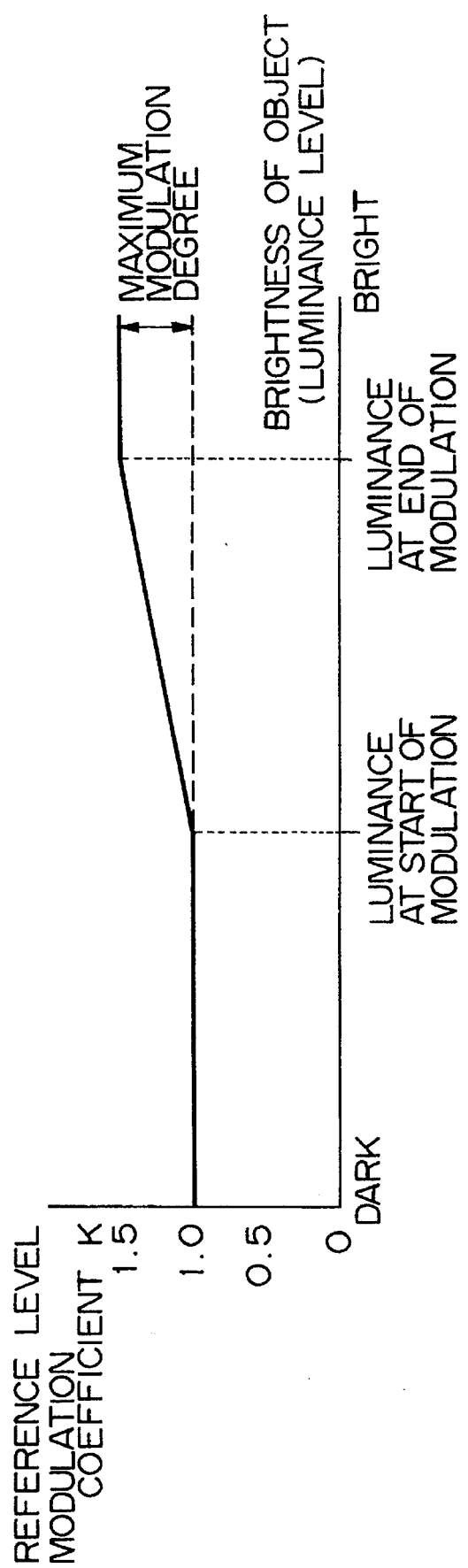
FIG. 6 is a diagram showing the relation between the reference level modulation coefficient K and a luminance level in the modification of the invention.

In the modification shown in FIG. 5, there is a relation between the reference level modulation coefficient K and the luminance level as shown in FIG. 6. That is, the reference level modulation coefficient K is set to K=1.0 up to the modulation start luminance level. K=maximum modulation degree from the modulation end luminance level. The modulation coefficients K until the modulation start and end luminance levels are obtained by linear approximation calculations. By making it possible to arbitrarily set the modulation start and end luminance levels and the maximum modulation degree from the outside, for instance, the video signal output level can be set in correspondence to a degree of feeling of the brightness of the user of the video camera.

As mentioned above, by storing the coefficients for modulating the exposure control reference value into the ROM or the like, the optimum exposure control reference value modulation according to the luminance signal level can be executed. Therefore, a fine exposure control according to a change in brightness which the user sees and feels can be performed. Since the iris is controlled to a slight open state at the high luminance (high illuminance), a picture blur (small aperture blur) due to the diffraction phenomenon of the iris can be avoided. By enabling the modulation start and end luminance levels and the maximum modulation coefficient to be arbitrarily changed, the user can freely form a picture.

Figure 7:
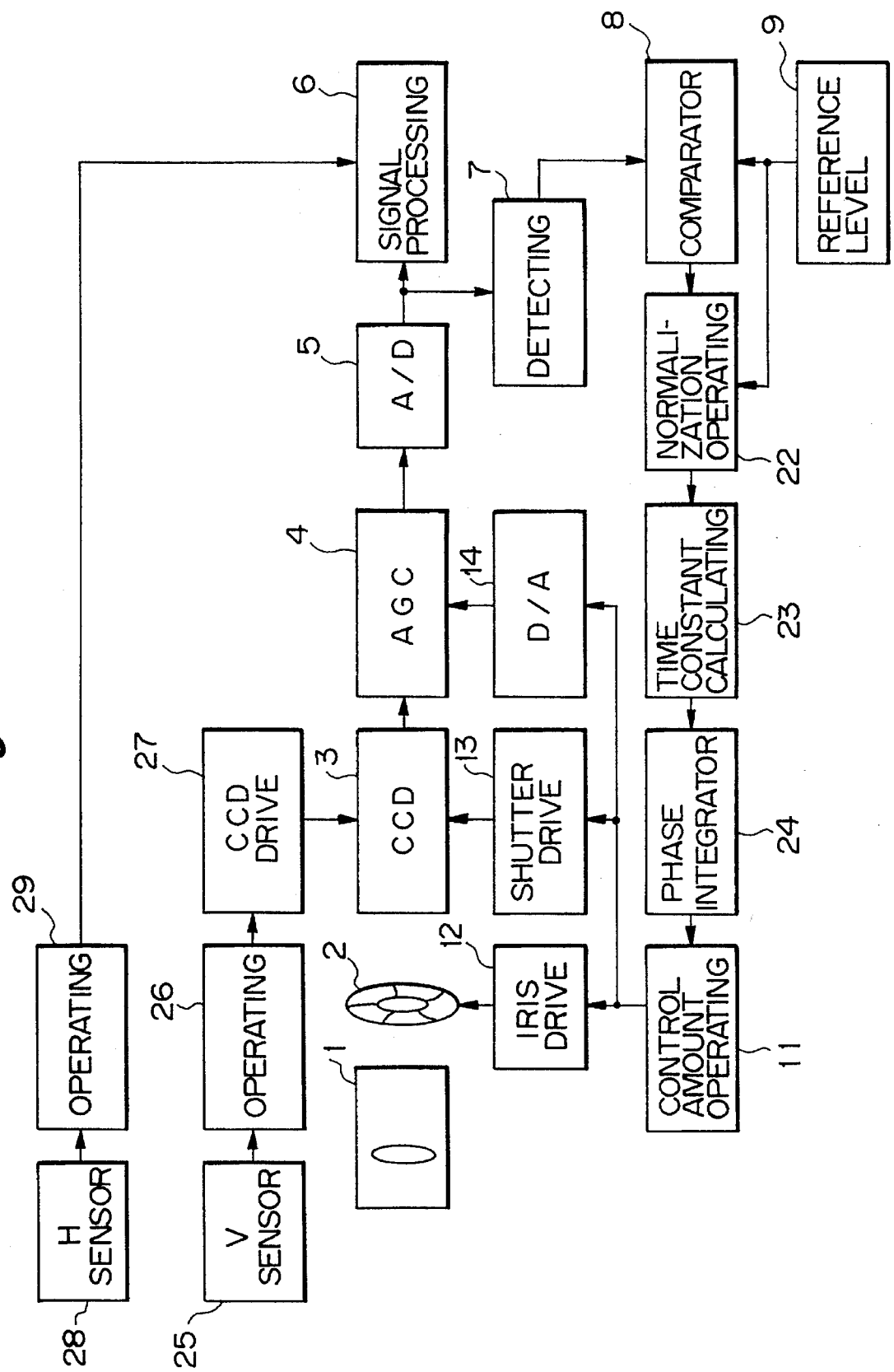
FIG. 7 is a block diagram of a video camera to which an exposing apparatus according to the invention is applied.

An embodiment in the case where a hand vibration correction is provided for the above video camera will now be described hereinbelow with reference to the drawings. FIG. 7 is a block diagram of the video camera with the hand vibration correcting function to which the exposing apparatus according to the invention is applied. In FIG. 7, the same circuits as those shown in FIG. 2 are designated by the same reference numerals. In FIG. 7, the light amount of the object image which passed through the lens 1 is formed as an image on the photosensitive surface of the CCD image pickup device 3 through the iris 2. The opening/closing operation of the iris 2 is controlled by the iris driving circuit 12. The electronic shutter is provided for the CCD image pickup device 3. The speed of the electronic shutter is set by the shutter driving circuit 13. The output of the CCD image pickup device 3 is supplied to the AGC amplifier 4. The gain of the AGC amplifier 4 is set in accordance with the output of the DA converter 14.

The output of the AGC amplifier 4 is supplied to the A/D converter 5. The A/D converter 5 converts the analog image pickup signal to the digital image pickup signal. The digital image pickup signal is supplied to the signal processing circuit 6 and to the detecting circuit 7. The signal processing circuit 6 executes a predetermined signal process such as gamma correction or the like to the supplied signal and, after that, outputs the processed signal as a video signal. On the other hand, the signal detected by the detecting circuit 7 is supplied to the comparator 8. The exposure reference level signal is supplied to the comparator 8 from the exposure reference level signal setting circuit 9. The comparator 8 compares the image pickup signal from the detecting circuit 7 and the exposure reference level signal.

The output of the comparator 8 is supplied to a normalization operating circuit 22. The exposure reference level signal is also supplied to the normalization operating circuit 22 from the exposure reference level signal setting circuit 9. The normalization operating circuit 22 calculates the quotient which is obtained by dividing [the output signal from the comparator 8] by [the exposure reference level signal]. The calculated value is output as a gain value. For example, when the output signal from the comparator 8 is twice as large as the exposure reference level signal, a signal of +6 dB is output from the normalization operating circuit 22. Likewise, when it is ½ time as large as the exposure reference level signal, a signal of −6 dB is output. When they are equal, a signal of 0 dB is output. The gain value of the normalization operating circuit 22 is supplied to a time constant calculating circuit 23. The time constant calculating circuit 23 increases the gain value that is supplied from the normalization operating circuit 22 by 1/K time (K is a constant). Due to this, a time constant of the whole exposure control system is set.

An output of the time constant calculating circuit 23 is supplied to a phase integrator 24 and is integrated. The gain value integrated in the phase integrator 24 indicates a large value as the brightness of the object is high, namely, as the image pickup signal level of the object is large. An output of the phase integrator 24 is supplied to the control amount operating circuit 11. The control amount operating circuit 11 calculates the control amount of the iris 2 (iris gain) according to the gain value, the control amount of the AGC amplifier 4 (AGC amplifier gain), and the control speed of the electronic shutter (gain of the electronic shutter). The calculated control amounts are supplied to the iris driving circuit 12, electronic shutter driving circuit 13, and D/A converter 14.

By applying the hand vibration correcting function when the object is photographed by the above video camera, the hand vibration in the vertical direction is detected by a V sensor 25. An output signal of the V sensor 25 is supplied to an operating circuit 26 and a correction amount for the V direction is calculated. The operating circuit 26 is connected to a CCD driving circuit 27. A driving signal based on the correction amount from the operating circuit 26 is supplied from the CCD driving circuit 27 to the CCD image pickup device 3. Due to this, the hand vibration in the V direction is corrected. A hand vibration in the horizontal direction is similarly detected by an H sensor 28. An output signal of the H sensor 28 is supplied to an operating circuit 29 and a correction amount for the H direction is calculated. The operating circuit 29 is connected to the signal processing circuit 6. On the basis of the correction amount which is output from the operating circuit 29, the hand vibration is corrected for the H direction of the image pickup signal supplied to the signal processing circuit 6. Refer to Japanese Patent Application No. H05-047434 filed by the same applicant as the present invention with respect to the details of the video camera with the hand vibration correcting function.

Figure 8:
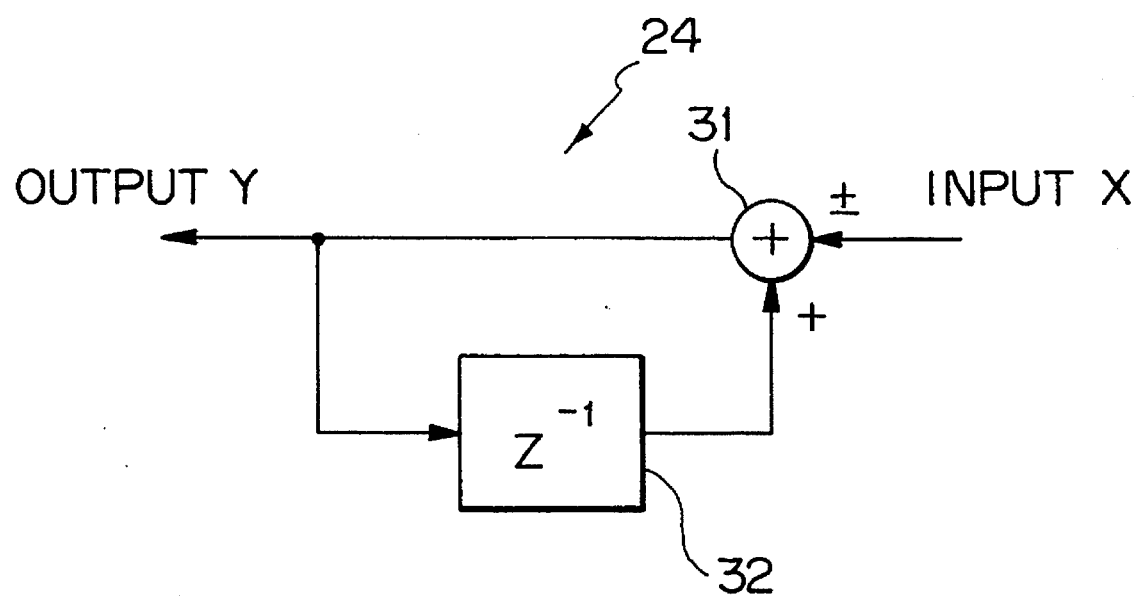
FIG. 8 is a block diagram showing the details of a phase integrating circuit.

FIG. 8 shows a block diagram of the phase integrator 24. In FIG. 8, the phase integrator 24 comprises an adding circuit 31 and a sample delay circuit 32. When a signal (hereinafter, referred to as X) generated from the time constant calculating circuit 23 is input to the phase integrator 24, its output (hereinafter, referred to as Y) is generated as an integration value of the input signal. Characteristics of the phase integrating circuit 24 are shown by the following equation.

$$Y=(X\times 1)/(1-Z^{-1})$$

Figure 9:
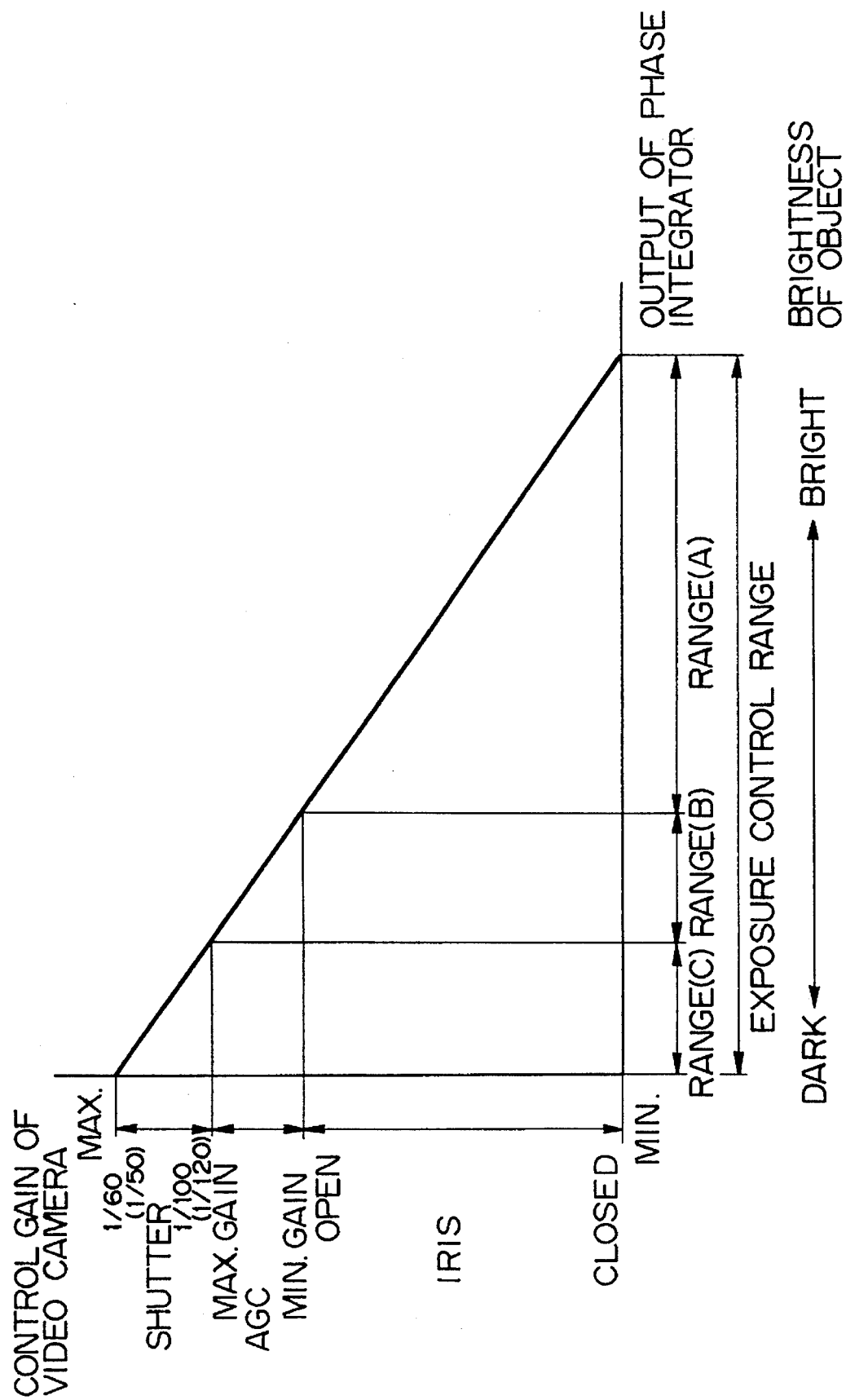
FIG. 9 is a diagram showing the relation between an output value of the phase integrating circuit and an output value of a Control amount operating circuit.

FIG. 9 shows the relations between the input of the control amount operating circuit 11, namely, the output value of the phase integrator 24 and the outputs of the control amount operating circuit 11, that is, the opening/closing control amount (gain) of the iris 2, the control amount (gain) of the AGC amplifier 4, and the speed control amount (gain) of the electronic shutter. In FIG. 9, an axis of abscissa shows a magnitude of the output of the phase integrator 24, namely, the brightness of the object. An axis of ordinate indicates a gain which can be controlled in the video camera, namely, the value that is obtained by adding the gain of the iris 2, the gain of the AGC amplifier 4, and the gain of the electronic shutter.

The gain of the iris 2 indicates a numerical aperture of the iris 2. In other words, when the numerical aperture of the iris 2 is maximum (the iris is opened), the maximum gain (0 dB) is set. When it is minimum (the iris is closed), the minimum gain ($-\infty$ dB) is set. The gain of the electronic shutter indicates the shutter speed of the electronic shutter. In case of the NTSC system, $\frac{1}{60}$ second is set to the maximum gain (0 dB). In case of the PAL system, $\frac{1}{50}$ second is set to the maximum gain (0 dB). The gain decreases as the shutter speed rises.

In FIG. 9, when the brightness of the object lies within a range (A), the exposure amount is controlled by only the numerical aperture of the iris 2. In this instance, the gains of the AGC amplifier 4 and the electronic shutter are set to the minimum gains. When the brightness of the object lies within a range (B), the exposure amount is controlled by the gain of the AGC amplifier 4. In this instance, the gain of the iris 2 is maximum and the gain of the electronic shutter is minimum. Further, when the brightness of the object lies within a range (C), the exposure amount is controlled by the gain of the electronic shutter, namely, by only the shutter speed. At this time, the gains of the iris 2 and the AGC amplifier 4 are set to the maximum gains.

As will be also obviously understood from FIG. 9, according to the invention, the exposure amount can be controlled in the whole range from the maximum output of the phase integrator 24 to the minimum output.

Figure 10:
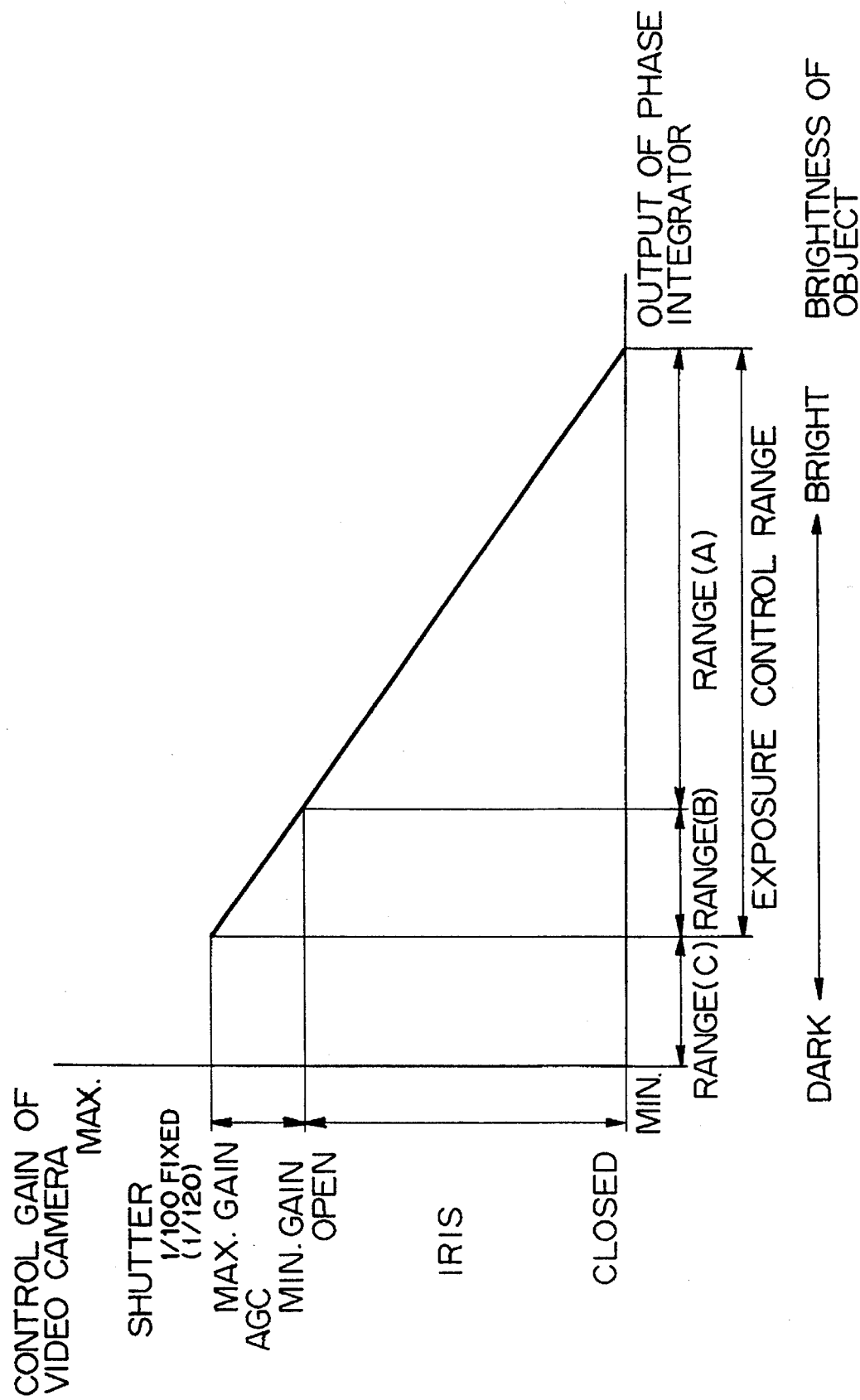
FIG. 10 is a diagram showing the relation between an ordinary exposure control range of a video camera having a hand vibration correcting function operation and a control gain.

FIG. 10 is a diagram showing the relation between the ordinary exposure control range of the video camera having the hand vibration correcting function operation and the control gain. An axis of abscissa and an axis of ordinate which are used in FIG. 10 indicate values similar to those described in FIG. 9. In the ranges (A) and (B), the operations similar to those described in FIG. 9 are executed. In the range (C) shown in FIG. 10, the speed of the electronic shutter is always fixed to $\frac{1}{100}$ second in the NTSC system and to $\frac{1}{120}$ second in the PAL system. Therefore, the exposure control can be performed only in the ranges (A) and (B). In case of the brightness of the object which lies within the range (C), the video camera cannot perform the exposure control to the object. Namely, in the video camera having such characteristics, the range in which the exposure control can be performed is narrowed by a range corresponding to only the gain of the electronic shutter, so that the minimum object illuminance is raised.

On the other hand, according to the invention, when the brightness of the object lies within the range (C), the speed of the electronic shutter can be changed within a range from $\frac{1}{60}$ to $\frac{1}{100}$ second in the NTSC system and within a range from $\frac{1}{50}$ to $\frac{1}{120}$ in the PAL system. Therefore, the exposure control can be performed in a range from the minimum brightness of the object to the maximum brightness, so that the exposure control range of the video camera can be made the most of and it is prevented that the minimum object illuminance is raised. With respect to a point of the effect such that the moving object resolution is improved by the hand vibration correcting function by the electronic shutter in the ranges (A) and (B), the performance that is equal to that of the video camera having the ordinary characteristics can be assured as mentioned above.

Figure 11:
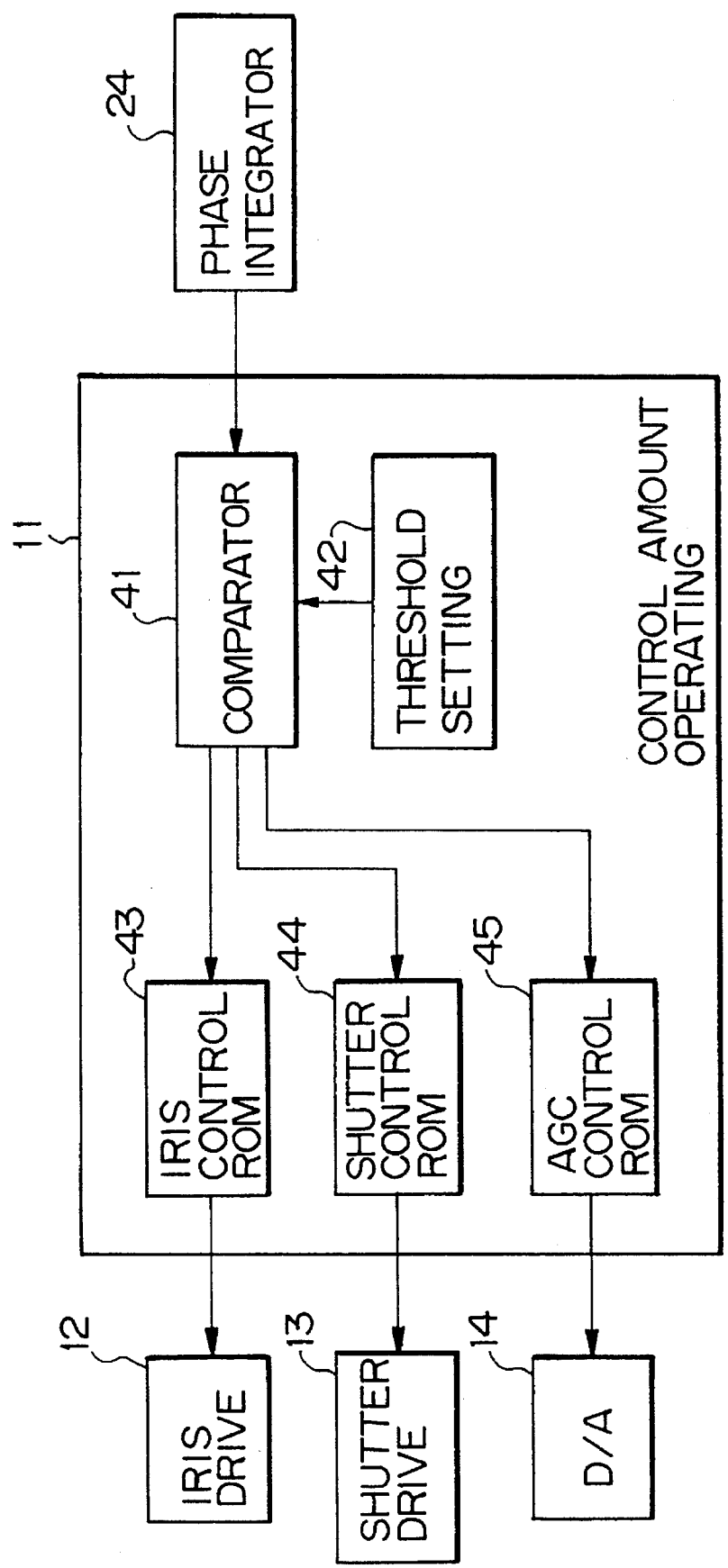
FIG. 11 is a detailed block diagram of the control amount operating circuit.

FIG. 11 is a detailed block diagram of the control amount operating circuit 11. The gain value integrated by the phase integrator 24 is supplied to a comparator 41. A threshold setting circuit 42 is connected to the comparator 41. Each threshold value to previously distribute the supplied gain value into the opening/closing control amount of the iris 2 (gain of the iris 2), the speed control amount of the electronic shutter (gain of the electronic shutter), and the control gain of the AGC amplifier 4 (gain of the AGC amplifier 4) is set into the comparator 41 by the threshold setting circuit 42.

Figure 12:
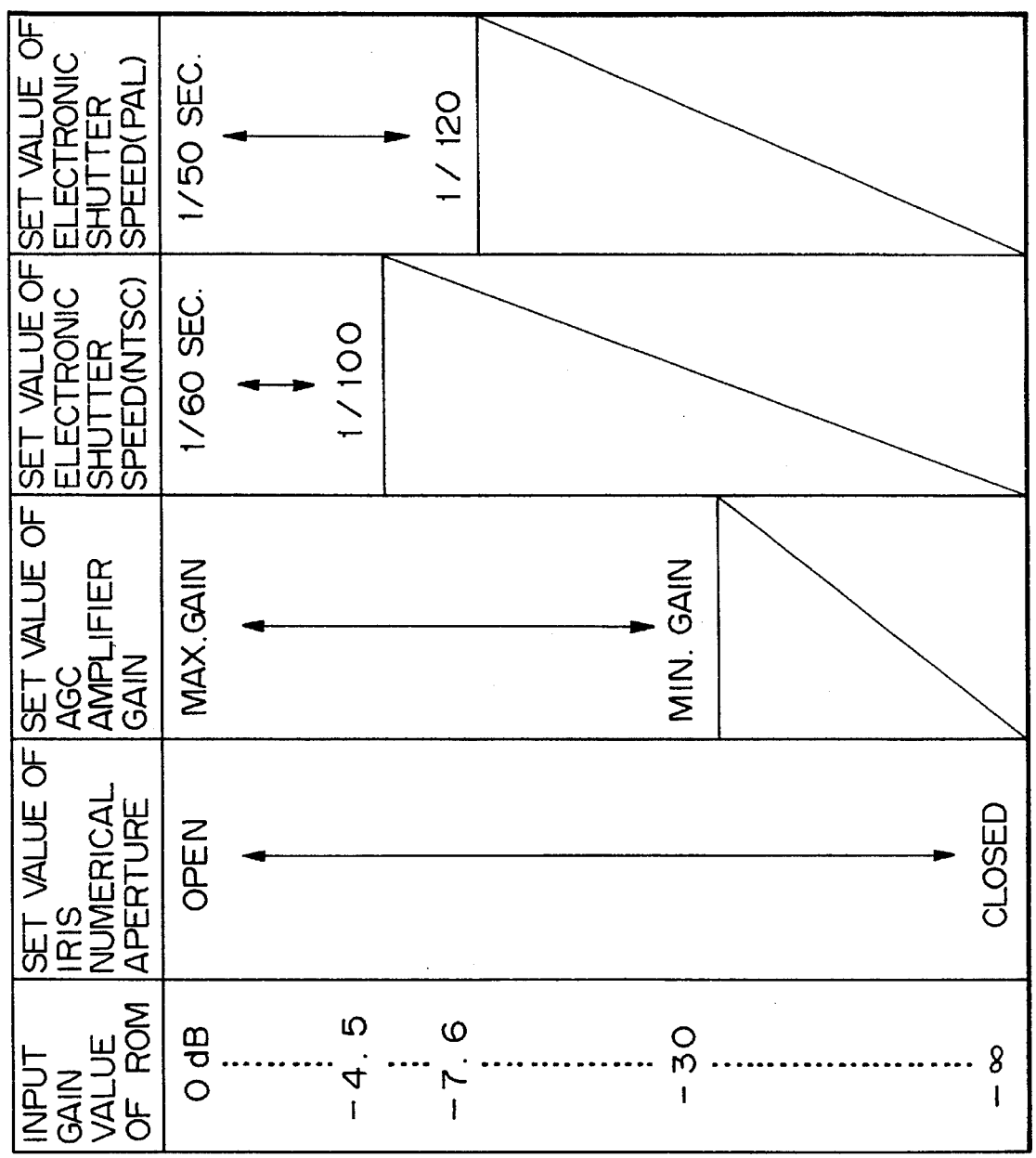
FIG. 12 is a diagram showing the relation between an input gain of a control ROM and its output.

The gain value supplied to the comparator 41 is distributed to each control gain by those threshold set values. The gain of the iris 2 is supplied to an iris control ROM 43. The gain of the electronic shutter is supplied to an electronic shutter control ROM 44. The gain of the AGC amplifier 4 is supplied to an AGC amplifier control ROM 45. FIG. 12 shows the relation between the input gains in the control ROM and the output. The numerical aperture of the iris 2, the gain of the AGC amplifier 4, and the speed (gain) of the electronic shutter according to the magnitudes of the input gain values have been stored in the respective control ROMs. An output of the iris control ROM 43 is supplied to the iris driving circuit 12. An output of the electronic shutter control ROM 44 is supplied to the electronic shutter driving circuit 13. An output of the AGC amplifier control ROM 45 is supplied to the D/A converter 14 to control the AGC amplifier 4. The minimum gain of the AGC amplifier 4 shown in FIG. 12 is set to, for example, −30 dB.

FIGS. 13, 14A and 14B show the relations between the electronic shutter speed in the range (C) in FIG. 9 and its gain. FIG. 13 shows the relations between the shutter speed in the NTSC system and the gain corresponding thereto. As will be also understood from FIG. 13, in case of a slow shutter speed (for instance, $\frac{1}{61}$ second), the gain is set to −0.14. On the other hand, in case of a high shutter speed (e.g., $\frac{1}{100}$ second), the gain is set into −4.44.

FIGS. 14A and 14B show the relations between the shutter speed in the PAL system and the gain corresponding thereto. As will be also understood from FIG. 14, in case of the slow shutter speed (e.g., $\frac{1}{51}$ second), the gain is set to −0.17. On the other hand, in case of a high shutter speed (e.g., $\frac{1}{120}$ second), the gain is set to −7.60.

As shown in FIGS. 13, 14A and 14B, in the range (C), by finely setting the gain of the electronic shutter, the optimum shutter speed can be used for the brightness of the object. The relations between the shutter speed and the gain are shown as examples in FIGS. 13 and 14. By rewriting the data in the shutter control ROM 44, various kinds of shutter gains can be set.

As mentioned above, in the operating state of the hand vibration correcting function of the image processing type, the speed of the electronic shutter at which the CCD image pickup device operates is properly changed in a range from 1/100 second to 1/60 second in the NTSC system or from 1/120 second to 1/50 second in the PAL system in accordance with the brightness of the object. Thus, it is possible to prevent that the operation guarantee range of the video camera is lost at a low illuminance. The moving object resolution that is necessary for the hand vibration correcting function can be assured in the same object illuminance range as that in the conventional system. By finely changing the speed of the electronic shutter, the influence on the picture quality by the speed change can be prevented. By setting the control time constant of the electronic shutter speed to the same value as the time constant to control the numerical aperture of the iris or the gain of the AGC amplifier, a natural exposure control can be executed.

The present invention is not limited to the foregoing embodiments but many modifications and variations are possible within the spirit and scope of the appended claims of the invention.

What is claimed is:

1. An exposing apparatus in a video camera, comprising:
   a lens group for fetching a light from an object;
   an iris for adjusting an amount of light from said lens group;
   an image pickup device for converting the light which passed through said iris into an electric signal;
   an AGC circuit for setting a signal level of an output signal from said image pickup device into a predetermined level;
   a detecting circuit for detecting a luminance signal level from an output signal from said AGC circuit;
   a reference level signal setting circuit for supplying an exposure control reference value;
   an exposure control reference value modulating circuit for modulating said exposure control reference value, said exposure control reference value modulating circuit comprising
   a luminance level operating circuit to which a gain of said iris and a gain amount of said AGC circuit are supplied; and
   an ROM having a reference level modulation coefficient according to a luminance level, and wherein an output signal from said ROM and an output signal from said reference level signal setting circuit are multiplied so as to form a modulation signal; and
   control means for receiving said modulation signal and said luminance signal level and for producing a plurality of control signals therefrom, said control signals being respectively utilized to control said iris, said image pickup device and said AGC circuit.

2. A video camera having an exposing apparatus, comprising:
   a lens group for fetching a light from an object;
   an iris for adjusting an amount of light from said lens group;
   an image pickup device for converting the light which passed through said iris into an electric signal;
   an AGC circuit for setting a signal level of an output signal from said image pickup device into a predetermined level;
   a detecting circuit for detecting a luminance signal level from an output signal from said AGC circuit;
   a reference level signal setting circuit for supplying an exposure control reference value;
   an exposure control reference value modulating circuit for modulating said exposure control reference value, said exposure control reference value modulating circuit comprising:
   a luminance level operating circuit to which a gain of said iris and a gain amount of said AGC circuit are supplied; and
   an ROM having a reference level modulation coefficient according to a luminance level, and wherein an output signal of said ROM and an output signal from said reference level signal setting circuit are multiplied so as to form a modulation signal; and
   control means for receiving said modulation signal and said luminance signal level and for producing a plurality of control signals therefrom, said control signals being respectively utilized to control said iris, said image pickup device and said AGC circuit.

3. A video camera having an exposing apparatus, comprising:
   a lens group for fetching a light from an object;
   an iris for adjusting an amount of light from said lens group;
   an image pickup device for converting the light which passed through said iris into an electric signal;
   an AGC circuit for setting a signal level of an output signal from said image pickup device into a predetermined level;
   a detecting circuit for detecting a luminance signal level from an output signal from said AGC circuit;
   a reference level signal setting circuit for setting an exposure control reference value to control the iris;
   an exposure control reference value modulating circuit for modulating said exposure control reference value when the iris is controlled, said exposure control reference value modulating circuit comprising:
   a luminance level operating circuit to which a gain of said iris and a gain amount of said AGC circuit are supplied;
   a high luminance judging circuit to which an output signal of said luminance level operating circuit is input and into which a start luminance level and an end luminance level of the reference level modulation are set;
   a modulation start/end setting circuit for setting the start luminance level and end luminance level of the modulation of said luminance signal;
   a modulation coefficient calculating circuit to which a modulation coefficient calculation level is input on the basis of the set values of said start and end luminance levels; and
   a modulation degree setting circuit for setting the maximum modulation degree of said modulation coefficient calculating circuit; and
   a control circuit for receiving said luminance signal level and an output signal from said exposure control reference value modulating circuit and for producing control signals therefrom.

4. A video camera according to claim 3, further having a shutter driving circuit for controlling an image pickup timing of said image pickup device,
   and wherein said control circuit controls said shutter driving circuit.

5. A video camera according to claim 4, wherein said control circuit controls each of said iris, said shutter driving circuit, and said AGC circuit.

* * * * *